United States Patent [19]

Forbes et al.

[11] Patent Number: 4,539,772

[45] Date of Patent: Sep. 10, 1985

[54] ADAPTERS FOR CONVERTING CERTAIN PLASTIC BOTTLES INTO DECOYS FOR DUCK HUNTERS

[75] Inventors: David R. Forbes; Carman S. Forbes, Hiawatha, Iowa

[73] Assignee: Hunter's Specialties, Inc., Cedar Rapids, Iowa

[21] Appl. No.: 630,096

[22] Filed: Jul. 12, 1984

[51] Int. Cl.³ .............................................. A01M 31/06
[52] U.S. Cl. ......................................................... 43/3
[58] Field of Search ............................ 43/3, 2; D22/21

[56] References Cited

U.S. PATENT DOCUMENTS

| | | | |
|---|---|---|---|
| D. 194,714 | 2/1963 | Paganelli . | |
| D. 204,211 | 3/1966 | Fahlgren . | |
| D. 205,480 | 8/1966 | Thomte . | |
| D. 210,866 | 4/1968 | Wickham . | |
| 2,259,018 | 10/1941 | Benson ....................... | 43/3 |
| 2,546,189 | 3/1951 | Keep .......................... | 43/3 |
| 3,830,010 | 8/1974 | Dowrick . | |
| 3,896,578 | 7/1975 | Franceschini ............... | 43/3 |
| 4,073,397 | 2/1978 | Snodgrass ................... | 43/3 |

FOREIGN PATENT DOCUMENTS 775308  1/1968  Canada ................................. 43/3

Primary Examiner—Gene P. Crosby
Attorney, Agent, or Firm—Simmons, Perrine, Albright & Ellwood

[57] ABSTRACT

A molded plastic adapter, simulating at its forward end the head, neck and upper breast portions of a duck, includes a rearwardly extending hollow keel such that an empty plastic two liter soft drink bottle can be secured atop the keel with the neck of the bottle located in the rear of the upper breast portion of the adapter, all to provide a light, inexpensive decoy for duck hunters.

5 Claims, 2 Drawing Figures

ADAPTERS FOR CONVERTING CERTAIN PLASTIC BOTTLES INTO DECOYS FOR DUCK HUNTERS

BACKGROUND OF THE INVENTION

Decoys for duck hunting have been traditionally carved from cork or wood. More recently these have been joined by decoys molded from various plastics and even papier mache. There are a few inflatable decoys of some suitable pliable material such as vinyl. But carved decoys are expensive, some present molded ones are not too durable, and all are relatively bulky in terms of shipping and retail storage space. Inflatable decoys are often unsatisfactory even though compact because, among other things, they must be individually inflated and are subject to puncture or other leakage. The chief object of the present invention is thus inexpensive and durable duck decoys which require minimum space to ship and store.

SUMMARY OF THE INVENTION

The invention takes advantage of the current availablity of many soft drinks in two liter plastic bottles, which bottles are discarded when empty. There have been, it is true, various bottles which are specifically molded in the shape of a duck, presumably so that they can be used first as containers and then as decoys. See, for instances, U.S. Pat. Nos. D194,714; D204,211; D205,480; and D210,866, as well as U.S. Pat. No. 4,073,397. But molding bottles as ducks in the first place seriously compromises their utility as containers in the sense that, because of their irregular shapes, they cannot be economically shipped and stored. Sometimes common plastic gallon jugs, simply painted, are used as "decoys", and U.S. Pat. No. 2,259,018 illustrates a molded plastic or rubber duck head that can be attached to a wooden block, a tin can or other buoyant material to form a crude decoy. In these latter instances, the results bear little resemblance to their live brethren.

The present invention, however, takes a different tack by providing an adapter by which empty two liter soft drink bottles can be easily converted into decoys of rather unique fidelity to the live fowl. The adapter consists of a hollow plastic molding of the head, neck and upper breast portions of a duck together with a hollow keel. The rear of the upper breast portion is apertured to receive the neck of the bottle which then lies on its side atop the keel. The bottle is retained by suitable means at the rear of the keel which engages the bottom of the bottle. The rear of the keel also includes a closable opening so that the keel can be filled with sand or other suitable weighting material. After molding, the head and breast portions are painted in colors appropriate to the duck species concerned.

The adapter can be sold separately or as part of a kit which also includes paint of suitable colors and some fletching decals for the bottles. There have been other conversion kits for plastic bottles for other purposes, such as that of U.S. Pat. No. 3,830,010 for turning a plastic jug or the like into a toy sail boat. But there considerable assembly is required plus punching holes in the bottle to receive and secure various parts of the kit. In the case of the present invention, however, no alteration of the bottles is required other than application of paint and decals.

Other features and advantages of the invention will appear from the drawings and the more detailed description which follows.

DETAILED DESCRIPTION OF THE PREFERRED EMBODIMENT

Figure 1:
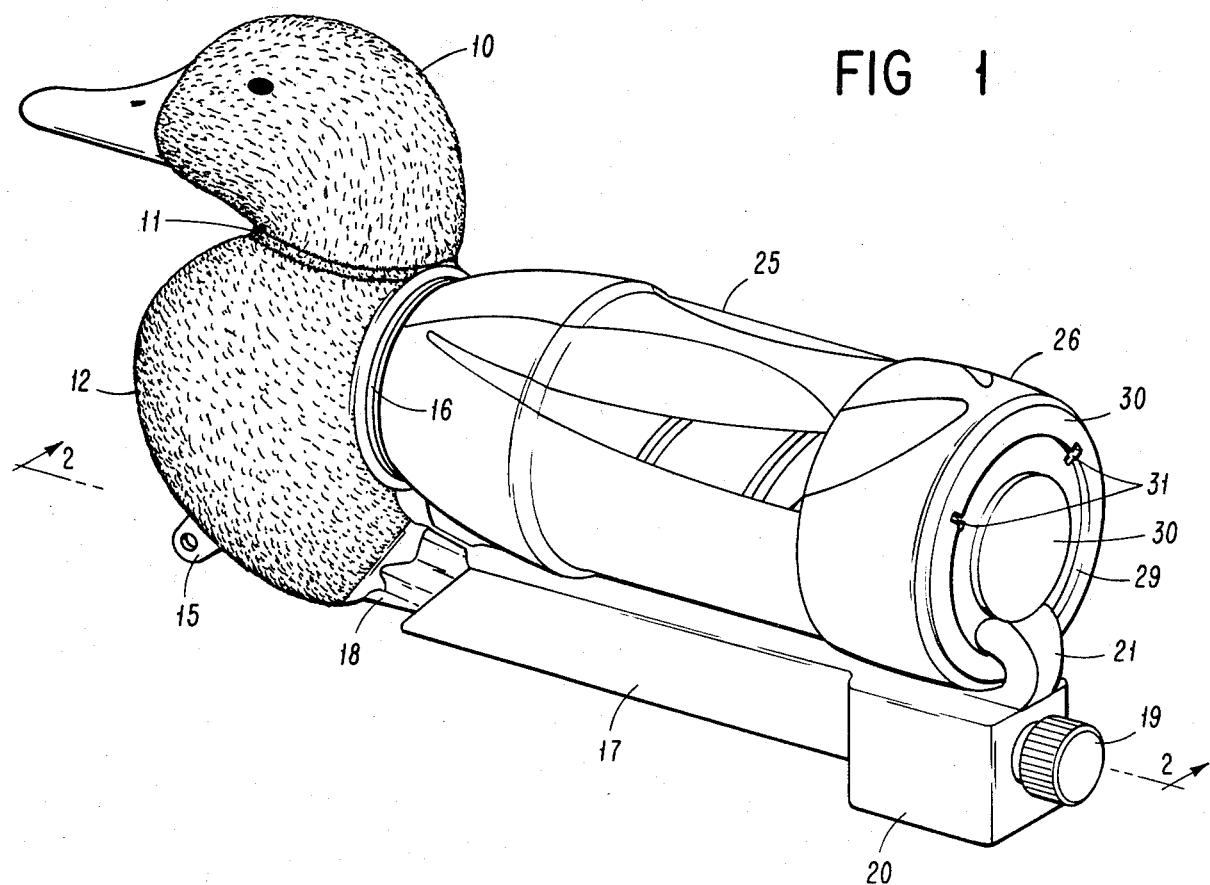
FIG. 1 is a perspective view of the adapter of the invention shown with a two liter soft drink bottle mounted in position in it, the fletching decals on the bottle also being indicated.
Figure 2:
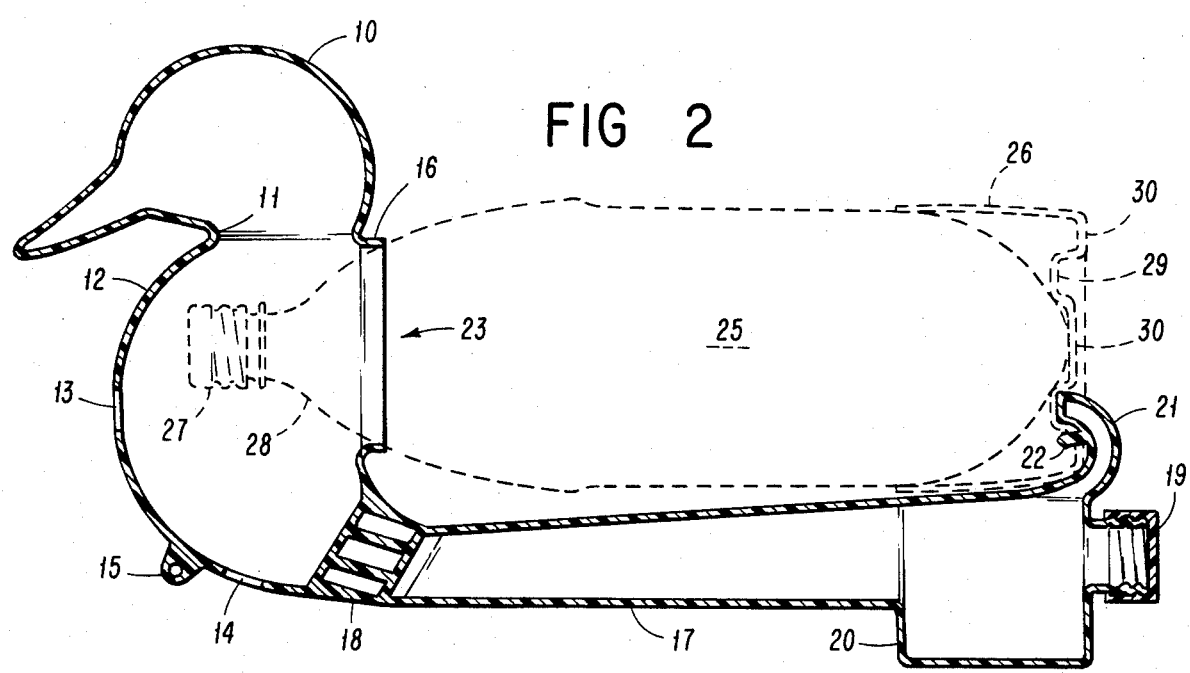
FIG. 2 is a sectional view of the adapter itself taken along the line 2—2 of FIG. 1, the bottle being also shown but in phantom.

Preferably the adapter of the invention is a hollow, integral blow molding from a high impact polyethylene plastic, and consists of a head (and bill) 10, neck 11, and upper breast 12 simulating those of a duck. The exterior surface of the foregoing (except the bill) is also molded to resemble the texture of the duck's feathers. The upper and lower portions of the breast 12 are provided with apertures 13 and 14, for reasons later explained, between which is an apertured lug 15 for attaching a decoy anchor. The upper rear of the breast 12 is molded with a large circular collar 16 whose outer end is closed over owing to the nature of the molding operation. Aft from the lower rear of the breast 12 extends a hollow, longitudinal keel 17 forming an interior angle with the face of the collar 16. The keel 17 is joined to the breast 12 by webs 18 so that the keel 17 comprises a separate compartment closed at its rear end by a screw-on cap 19. The rear portion 20 of the keel 17 just forward of the cap 19 is enlarged, as shown in FIGS. 1 and 2, for purposes to be described. Above the cap 19 the keel 17 is provided with an upstanding, forwardly curling, bottle retaining hook 21 having a forwardly directed tang 22. After removal from the mold the adapter is trimmed by removing the material closing the collar 16, thus providing a large aperture 23, then flame treated with 10 parts compressed air and one part natural gas to allow good paint adhesion. The adapter is next spray painted in appropriate colors; for instance, in the case of a Mallard drake, the head 10 may be dark green (the bill yellow with a black tip and the eyes also black); the neck 11, white; and the remainder of the adapter, dark brown. In the case of the hen, the entire body is dark brown, the bill orange and black, and the eyes black.

A typical, cylindrical two liter soft drink bottle 25 is prepared by removing the labels by soaking in hot water. The black surface of the bottle's lower end cap 26, usually of different material than the remainder of the bottle, is then lightly abraded with steel wool for better paint adhesion in the case of the hen and to dull it in the case of the drake so as better to simulate the drake's tail feathers. The bottle 25 is next painted the appropriate color, gray (except the end cap 26) in the case of a Mallard drake, and brown overall in the case of a Mallard hen. After the paint is dry the bottle 25 is disposed longitudinally atop the keel 17 with its cap 27 in place and the latter and the neck 28 thrust into and against the rim of the aperture 23. As this is done the hook 21 is pulled rearwardly so that it can engage the annular depression 29, typical of these bottles, in the bottom wall 30 of the end cap 26, the tang 22 engaging in turn one of the three or four openings 31, also typical of these bottles, spaced around the rim of the bottom wall 30. The bottle 25 is thus securely held on the keel 17.

Then the appropriate decals for back, wing sections and wing tips are applied depending upon whether for drake or hen, those shown in FIG. 1 being for a drake. The paint and decals can be furnished with the adapter as a kit for the hunter or sold separately. Whether sold alone or as a kit the adapters need little shipping or retail storage space, especially compared with integrally carved or molded decoys. In any event, once assembled the result is a simple and inexpensive but faithful decoy, light in weight, and making good use of an otherwise discarded container.

To prepare the decoys for the water the keel end cap 19 is removed, the keel 17 filled with sand or similar suitable material, and the cap 19 replaced. In the water the enlarged portion 20 at the rear of the keel 17 provides good stability to the decoy when anchored at 15, promoting a quite life-like bobbing motion. The apertures 13 and 14 in the front of the breast contribute to that motion by allowing water to flow in and out as the decoy bobs, as well as providing an egress for water leaking into the breast 12 between the aperture 23 and the bottle neck 28. Note that should the decoy become damaged by puncture or breakage of the bottle by shot or other accident, it can be repaired by merely replacing the bottle, all at little cost compared with that of replacing an integrally carved or molded decoy.

Though the invention has been described in terms of a particular embodiment, being the best mode known of carrying out the invention, it is not limited to that embodiment alone. Instead, the following claims are to be read as encompassing all adaptations and modifications of the invention falling within its spirit and scope.

We claim:

1. For use with a closed, empty bottle of approximately two liter capacity having a cylindrical side wall, a neck portion at one axial end and a bottom portion at the other axial end, an adapter to form with the bottle a floatable decoy for duck hunters, the adapter in its operative position comprising: an upright molded duck portion simulating the head, neck and upper breast portions of a duck, the breast portion having upper and lower front portions and upper and lower rear portions; a molded, hollow keel portion extending longitudinally rearward from the breast lower rear portion and defining a longitudinally extending closed compartment, the keel portion having an upper longitudinal surface portion forming an interior angle with the breast upper rear portion effective to underlie the cylindrical side wall of the bottle when positioned thereon with its axis disposed longitudinally of the keel portion, the keel portion having a closable access opening into the interior thereof for filling the same with weighting means for the decoy; an opening in the breast upper rear portion to receive and locate the neck portion of the bottle when positioned as aforesaid; and means carried by the keel portion to retain the remainder of the bottle in position as aforesaid.

2. The adapter of claim 1 wherein the bottle retaining means is disposed adjacent the keel rear end portion and is engageable with the bottom portion of the bottle.

3. The adapter of claim 2 wherein the keel portion includes an enlarged rear end portion, the closable access opening of the keel portion being disposed at the rear end thereof.

4. The adapter of claim 3 wherein the duck portion is also hollow and includes a pair of upper and lower openings in the breast portion disposed respectively in the upper and lower front portions thereof.

5. The adapter of claim 4 wherein the duck and keel portions are integral, and the duck breast portion includes means integral therewith for attaching an anchor to the adapter.

* * * * *